(12) United States Patent
Fuse

(10) Patent No.: US 8,388,874 B2
(45) Date of Patent: Mar. 5, 2013

(54) HOT-MELT MOLDING APPARATUS

(75) Inventor: Kenichi Fuse, Hadano (JP)

(73) Assignee: Empire Technology Development LLC, Wilmington, DE (US)

( * ) Notice: Subject to any disclaimer, the term of this patent is extended or adjusted under 35 U.S.C. 154(b) by 74 days.

(21) Appl. No.: 12/969,011

(22) Filed: Dec. 15, 2010

(65) Prior Publication Data

US 2011/0221088 A1   Sep. 15, 2011

(30) Foreign Application Priority Data

Mar. 12, 2010   (JP) .................................. 2010-056236

(51) Int. Cl.
*B29C 45/74*       (2006.01)
*B29C 47/78*       (2006.01)

(52) U.S. Cl. .................. 264/40.6; 264/328.14; 425/143; 425/378.1; 425/404; 425/550

(58) Field of Classification Search ................ 264/40.6, 264/328.14; 425/143, 404, 378.1, 550
See application file for complete search history.

(56) References Cited

FOREIGN PATENT DOCUMENTS

| JP | 06-008896 A | | 1/1994 |
|---|---|---|---|
| JP | 2006-253602 A | | 9/2006 |
| JP | 2009-148900 A | | 7/2009 |
| JP | 2010-036338 | * | 2/2010 |

OTHER PUBLICATIONS

Electronic Translation Japanese 2010-036338.*
Electronic Translation Japanese 2009-148900.*

* cited by examiner

*Primary Examiner* — Jill Heitbrink
(74) *Attorney, Agent, or Firm* — Maschoff Gilmore & Israelsen (57) ABSTRACT

A hot-melt molding apparatus includes an apparatus body, a cylinder, a molding head, a heating device, a conveyor screw, a heat transport section, a thermoelectric element, and a power storage section. The cylinder communicates with the apparatus body and is configured to receive thermoplastic material. The molding head is provided at one end of the cylinder. The heating device is configured to heat the cylinder and the molding head to melt thermoplastic material therein. The conveyor screw is provided inside the cylinder to convey thermoplastic material to the molding head. The heat transport section has a first end connected to at least one of the cylinder and the molding head. The thermoelectric conversion element is connected to a second end of the heat transport section. The power storage section is connected to the thermoelectric conversion element and is configured to store power generated by the thermoelectric conversion element.

19 Claims, 5 Drawing Sheets

HOT-MELT MOLDING APPARATUS

CROSS-REFERENCE TO RELATED APPLICATIONS

This application claims priority to Japanese Patent Application No. 2010-056236 filed Mar. 12, 2010, which is incorporated herein by reference in its entirety.

TECHNICAL FIELD

Embodiments disclosed herein relate to a hot-melt molding apparatus for molding a thermoplastic material such as plastic into a desired shape through hot melting.

BACKGROUND

Hot-melt molding apparatuses such as extrusion molding machines and injection molding machines are used to mold thermoplastic material(s) such as plastic into desired shapes through hot melting. The hot-melt molding apparatus requires a lot of power in processes for manufacturing molded articles. Thus, particularly in a process where the apparatus itself needs to be increased in temperature, power consumption should be kept to a minimum.

To minimize power consumption of such apparatuses, attempts have been made to improve the production efficiency by increasing the manufacturing speed, setting the preset temperature to which the temperature of the apparatus is to be increased to a lower limit value, and the like.

Recently, reduction in emissions of carbon dioxide ($CO_2$) from production facilities or factories is considered as one measure to address global environmental issues. Thus, there is a demand to improve the efficiency of energy used in production facilities or factories.

However, when thermoplastic material is molded using existing hot-melt molding apparatuses, heat energy dissipating from the hot-melt molding apparatus is not recycled in a process where the hot-melt molding apparatus is heated to a predetermined set temperature by a heater or the like and maintained at the temperature, for example.

BRIEF SUMMARY

A hot-melt molding apparatus according to some embodiments disclosed herein includes a cylinder, a molding head, a heating device, a conveying section, a heat-conductive member, a heat pipe, and a thermoelectric conversion element. The cylinder has a supply port configured to receive a thermoplastic material, and a discharge port configured to discharge the received thermoplastic material. The molding head is in communication with the discharge port of the cylinder. The heating device is configured to heat the cylinder and the molding head to melt thermoplastic material within the cylinder and the molding head. The conveying section is disposed in the cylinder and is configured to convey thermoplastic material in the cylinder to the molding head. The heat-conductive member is connected to a high-temperature portion including at least one of the cylinder and the molding head. The heat-conductive member has a ring shape and is disposed along an outer peripheral surface of at least one of the cylinder and the molding head. The heat pipe has a first end connected to the heat-conductive member and a second end opposite the first end. The thermoelectric conversion element has a first surface connected to the second end of the heat pipe, and a second surface located on an opposite side from the first surface and connected to a low-temperature portion. The low-temperature portion has a first temperature lower than a second temperature of the high-temperature portion. The power storage section is connected to the thermoelectric conversion element and is configured to store power generated by the thermoelectric conversion element.

A hot-melt molding apparatus according to some embodiments disclosed herein includes a cylinder, a molding head, a heating device, a conveying section, a heat transport section, a thermoelectric conversion element, and a power storage section. The cylinder has a supply port configured to receive a thermoplastic material, and a discharge port configured to discharge the received thermoplastic material. The molding head is in communication with the discharge port. The heating device is configured to heat the cylinder and the molding head to melt thermoplastic material within the cylinder and the molding head. The conveying section is disposed in the cylinder to convey thermoplastic material in the cylinder to the molding head. The heat transport section has a first end and a second end opposite the first end, the first end being connected to at least one of the cylinder and the molding head. The thermoelectric conversion element has a first surface connected to the second end of the heat transport section, and a second surface located on an opposite side from the first surface. The second surface is connected to a low-temperature portion having a first temperature lower than a second temperature of a connection position where the first end of the heat transport section is connected to the at least one of the cylinder and the molding head. The power storage section is connected to the thermoelectric conversion element and is configured to store power generated by the thermoelectric conversion element.

The heat transport section may include a heat pipe according to some embodiments disclosed herein. A first end of the heat pipe may be connected to the connection position via a heat-conductive member. Furthermore, the heat-conductive member may be provided in a ring shape along an outer peripheral surface of at least one of the cylinder and the molding head.

In some embodiments disclosed herein, the heat-conductive member includes an inner peripheral surface in close contact with the outer peripheral surface of at least one of the cylinder and the molding head, and a portion other than the inner peripheral surface of the heat-conductive member may be at least partially covered by a heat-insulating material.

In some embodiments disclosed herein, the low-temperature portion may include a housing configured to house a driving section adapted to drive the cylinder, or the low-temperature portion may be provided separately from the hot-melt molding apparatus.

In some embodiments, the conveying section may include a screw having a longitudinal axis that is substantially parallel to a longitudinal axis of the cylinder.

The hot-melt molding apparatus according to some embodiments may be an injection molding machine, an extrusion molding machine, or the like.

The hot-melt molding apparatus according to some embodiments may further include a device connected to the power storage section to operate with the power stored in the power storage section. The device may include, for example, a control panel and a sensor.

A hot-melt molding method according to some embodiments includes supplying thermoplastic material into a cylinder. The method also includes heating the cylinder to melt the thermoplastic material in the cylinder. The method also includes molding the melted thermoplastic material. The method also includes connecting a high-temperature portion having a high temperature and a low-temperature having a low temperature to generate power using a temperature difference between the high-temperature portion and the low-temperature portion. The method also includes storing the generated power.

DETAILED DESCRIPTION

Next, a hot-melt molding apparatus according to some embodiments will be described by reference to the figures. Note that the embodiments described below are merely illustrative and the present disclosure is not intended to be limited to the embodiments disclosed herein. Thus, the present disclosure may be embodied in various forms without departing from the scope of the appended claims.

Figure 1:
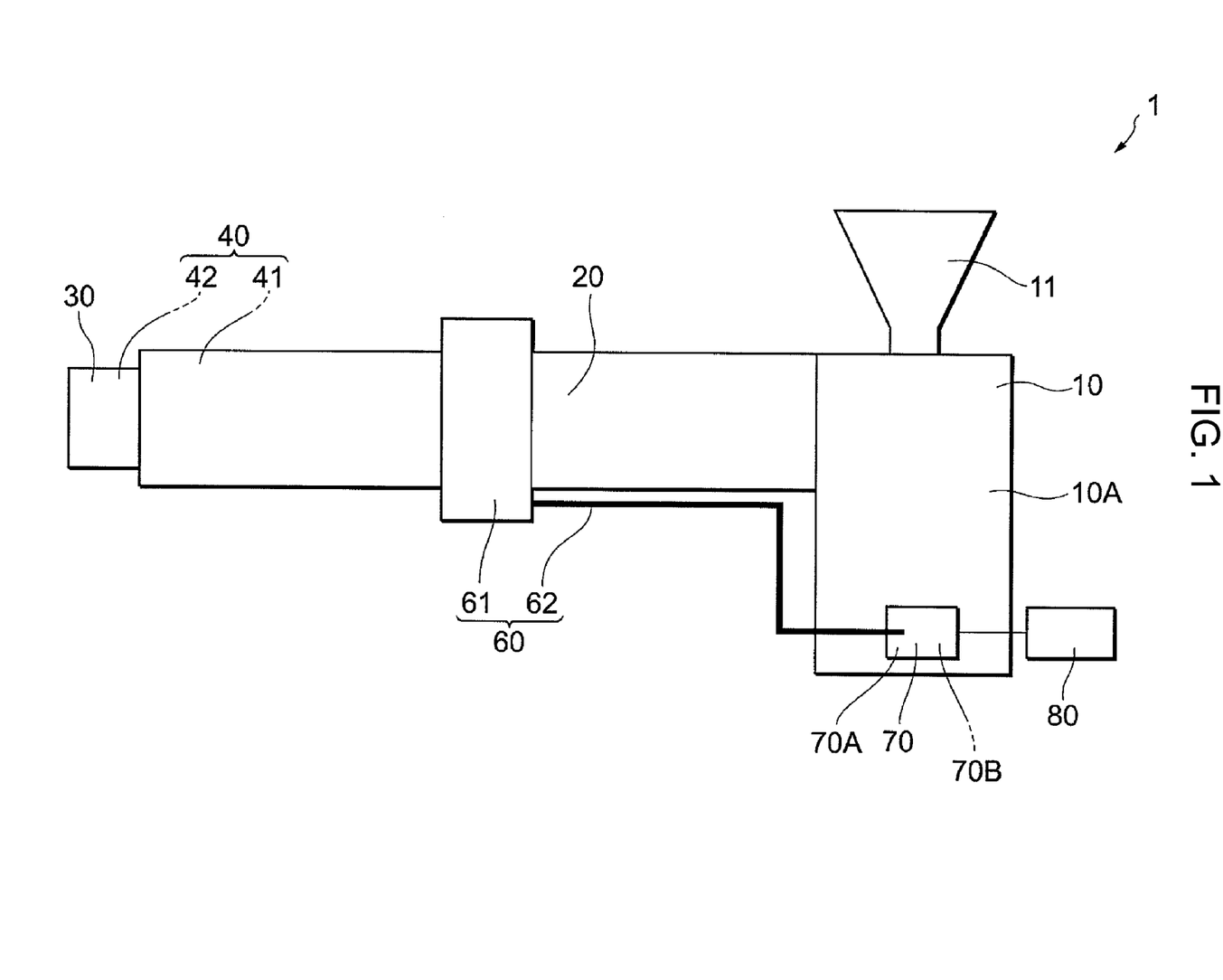
FIG. 1 is side view schematically illustrating a hot-melt molding apparatus according to some embodiments.
Figure 2:
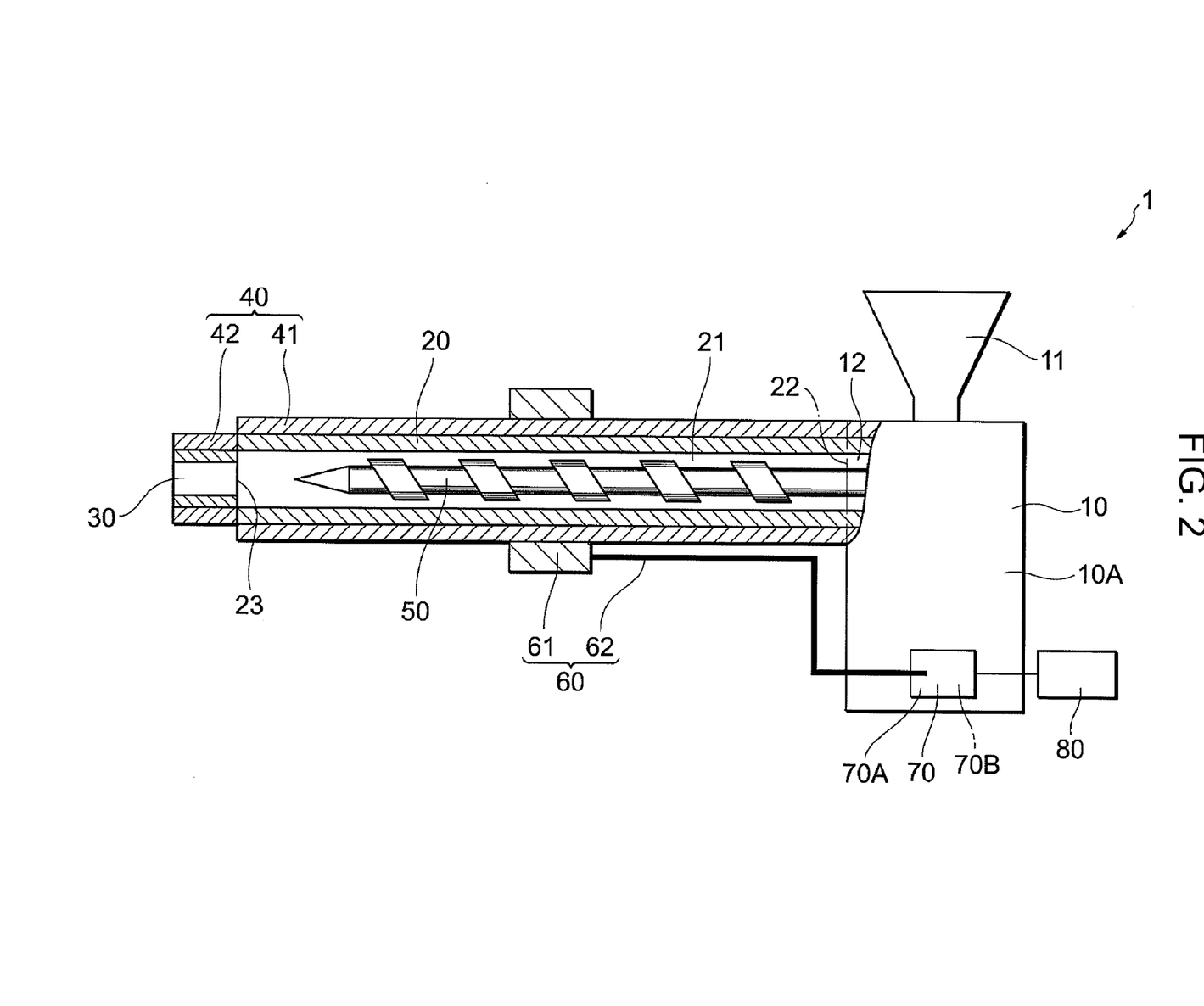
FIG. 2 is a partial sectional view schematically illustrating the hot-melt molding apparatus of FIG. 1.

FIG. 1 is a side view schematically illustrating a hot-melt molding apparatus according to some embodiments of the present disclosure. FIG. 2 is a partial sectional view schematically illustrating the hot-melt molding apparatus of FIG. 1. Note that the thickness, size, enlargement/reduction ratio and the like of each member in each of the figures are not matched with actual values for the simplicity of illustration.

As shown in FIGS. 1 and 2, a hot-melt molding apparatus 1 according to some embodiments of the present disclosure is an extrusion molding machine. The hot-melt molding apparatus 1 includes an apparatus body 10, a cylinder 20 having a communicating path 21 communicating with the apparatus body 10, a molding head 30 communicating with the cylinder 20 on the opposite side from the apparatus body 10, a heater 41 for heating the cylinder 20, a heater 42 for heating the molding head 30, a conveyor screw 50 provided inside the cylinder 20, a heat-conductive member 61 provided in a ring shape along an outer peripheral surface of the cylinder 20, a heat pipe 62 having one end connected to the heat-conductive member 61, a thermoelectric conversion element 70 connected to the other end of the heat pipe 62, and a power storage section 80 connected to the thermoelectric conversion element 70.

A hopper 11 is provided at the top of the apparatus body 10. A pellet or pellets of thermoplastic material (for example, low-density polyethylene) is fed as a raw material into the hopper 11. A supply path 12 is formed inside the apparatus body 10 to supply the thermoplastic material fed from the hopper 11 to the communicating path 21 of the cylinder 20. Although not shown in FIGS. 1 and 2, a motor for driving the conveyor screw 50 and a control device for controlling the motor, or the like, are also mounted in the apparatus body 10. A housing 10A of the apparatus body 10 is heated to a temperature of about 30° C. while the thermoplastic material is being molded by the hot-melt molding apparatus 1.

The cylinder 20 is a substantially cylindrical hollow member extending from the apparatus body 10. The hollow portion constitutes the communicating path 21 communicating with the supply path 12 of the apparatus body 10. To be more specific, an end portion of the communicating path 21 on the apparatus body 10 side defines a supply port 22 to receive the thermoplastic material supplied from the supply path 12 of the apparatus body 10, and an end portion on the opposite side from the supply port 22 of the communicating path 21 defines a discharge port 23 to discharge the thermoplastic material moved (conveyed) through the communicating path 21 to the molding head 30. The cylinder 20 has an outer diameter of 90 millimeters (mm) according to some embodiments.

The molding head 30 extrudes the thermoplastic material supplied from the discharge port 23 into a predetermined die. The thermoplastic material supplied to the die is formed into a predetermined shape.

The heater 41 is provided on the outer peripheral surface of the cylinder 20 and may be interposed between the heat-conductive member 61 and the outer peripheral surface of the cylinder 20. When the heater 41 heats the cylinder 20, the thermoplastic material supplied to the communicating path 21 is melted with heat. The heater 42 is provided on an outer peripheral surface of the molding head 30. When the heater 42 heats the molding head 30, the thermoplastic material in the molding head 30 is melted with heat. In the illustrated embodiment, the heaters 41 and 42 constitute a heating device 40.

The heaters 41 and 42 may heat the cylinder 20 and the molding head 30 to the same temperature or to different temperatures as needed. Although not shown, the cylinder 20 and the molding head 30 may optionally be heated by a single heater. According to some embodiments, the heaters 41 and 42 heat the cylinder 20 and the molding head 30 to about 250° C., respectively.

The conveyor screw 50 has a longitudinal axis parallel to a longitudinal axis of the cylinder 20. The conveyor screw 50 conveys the thermoplastic material in the cylinder 20 to the molding head 30 by rotating to move the thermoplastic material toward the discharge port 23. The conveyor screw 50 also kneads the thermoplastic material melted with heat from the heater 41 while the thermoplastic material is being conveyed (moved). In some embodiments, an axial length (L) of the conveyor screw 50 is set such that a ratio of the length (L) to a diameter (D) of the cylinder 20 (L/D) is 30.

The heat-conductive member 61 is made of a material having high heat conductivity, and is provided in a ring shape along the outer peripheral surface of the cylinder 20 and/or with the heater 41 interposed therebetween. Examples of the material having high heat conductivity include silver (Ag), copper (Cu), gold (Au), aluminum (Al), iron (Fe), and alloys of theses metals. By providing the heat-conductive member 61 in a ring shape, heat dissipated from the heated cylinder 20 can be effectively collected. An axial width of the heat-conductive member 61 can be set to any value as needed. In some embodiments, the heat-conductive member 61 has a temperature during operation of about 140° C. due to the heat dissipated from the heated cylinder 20.

One end, e.g., a first end, of the heat pipe 62 is connected to the heat-conductive member 61. In the illustrated embodiment, the heat-conductive member 61 and the heat pipe 62 constitute a heat transport section 60.

The heat pipe 62 is a closed-loop heat transfer element having a configuration in which a heat medium with a high vaporization heat and a high vapor diffusion rate is enclosed in a pipe including metal such as aluminum, copper and stainless steel, and using the latent heat of vaporization and condensation of the heat medium. The heat pipe 62 can thereby transfer a large quantity of heat with a small temperature difference. The heat pipe 62 may include a circular pipe, and can be bent into a desired shape or formed into a flat-plate shape when mounted on the outer peripheral surface of the cylinder 20. The other end of the heat pipe 62, e.g., a second end, is connected to a first surface 70A of the thermoelectric conversion element 70 described below in more detail.

In some embodiments, the heat pipe 62 may include a "Micro heat pipe CW05G-R (trade name)": manufactured by Furukawa Electric Co., Ltd., for example.

The thermoelectric conversion element 70 includes a Peltier element in some embodiments. The thermoelectric conversion element 70 has the first surface 70A and a second surface 70B located on the opposite side from the first surface 70A. The second end of the heat pipe 62 is connected to the first surface 70A. The second surface 70B is connected to the outer surface of the housing 10A of the apparatus body 10.

In the thermoelectric conversion element 70 implemented as a Peltier element, n-type and p-type semiconductors are held between two rectangular metal plates spaced apart from each other. Lead wires extend respectively from the n-type and p-type semiconductors. The lead wires are electrically connected to the power storage section 80. In these and other embodiments, the thermoelectric conversion element 70 generates power due to the Seebeck effect when heat is applied to one surface (the first surface 70A) and a temperature difference between the one surface and the opposite surface (the second surface 70B) thereby reaches or exceeds a predetermined temperature. The electromotive force (thermal electromotive force) increases as the temperature difference is larger.

According to some embodiments, the heat pipe 62 is connected to the first surface 70A of the thermoelectric conversion element 70, to heat the first surface 70A to about 140° C. with the heat from the heat pipe 62. Meanwhile, the second surface 70B of the thermoelectric conversion element 70 is mounted on the housing 10A of the apparatus body 10 (the surface temperature of the housing 10A may be about 30° C. as described above), and thereby has a temperature of about 30° C. during operation. Therefore, a temperature difference between the first surface 70A (a high-temperature portion) and the second surface 70B (a low-temperature portion) of the thermoelectric conversion element 70 is about 110° C. The power generated by the thermoelectric conversion element 70 using a temperature difference of about 110° C. is about 4 to 6 Watts in some embodiments.

The thermoelectric conversion element 70 also provides a Peltier effect in some embodiments. In particular, when current is applied to the two metal plates of the thermoelectric conversion element 70, heat is transferred from one of the metal plates to the other metal plate.

In some embodiments, the thermoelectric conversion element 70 may include a "Thermoelectric generator module: TMG-127-1.4-1.2 (trade name)": manufactured by Ferrotec Corporation.

The power storage section 80 can store the power (e.g., 4 to 6 Watts) generated by the thermoelectric conversion element 70 and retrieve the stored power as needed. In embodiments where a device to which the stored power is supplied requires alternating-current power, direct-current power can be converted into alternating-current power using an inverter.

In some embodiments, the power storage section 80 includes an "FHR-AAA760 (trade name)" battery (nominal voltage: 1.2 V, rating capacity: 760 mAh/0.2 It, standard charge: 76 Max×16 H, dimension: 10.5×50): manufactured by The Furukawa Battery Co., Ltd.

Figure 3:
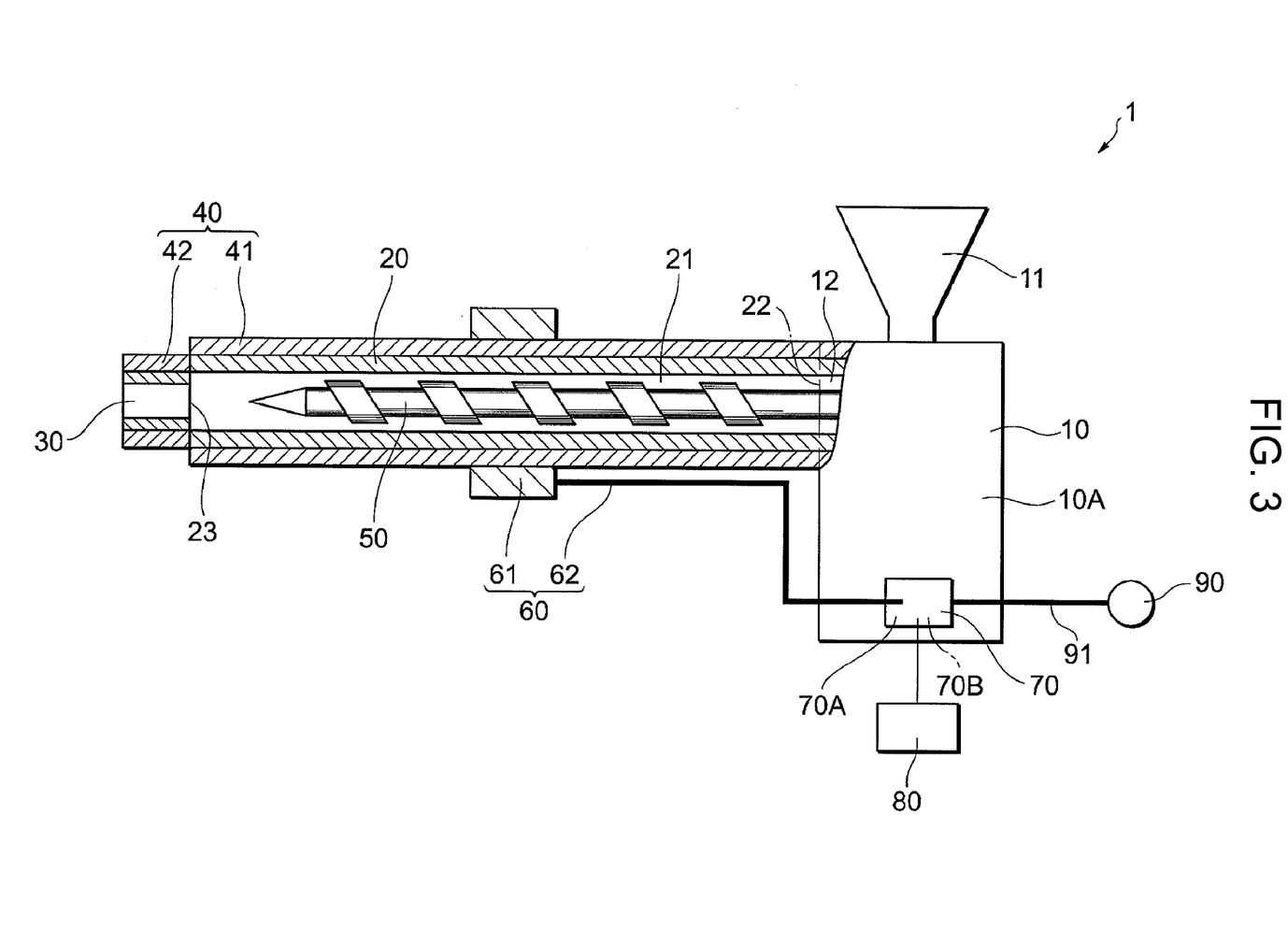
FIG. 3 is a partial sectional view schematically illustrating a hot-melt molding apparatus according to another embodiment.

FIGS. 1 and 2 illustrate an embodiment in which the second end of the heat pipe 62 is connected to the first surface 70A of the thermoelectric conversion element 70 (e.g., a Peltier element) and the second surface 70B of the thermoelectric conversion element 70 is connected to the housing 10A. However, the present disclosure is not limited thereto. For example, as shown in FIG. 3, the second surface 70B of the thermoelectric conversion element 70 may be connected to a low-temperature system 90 provided separately from the hot-melt molding apparatus 1 in a room where the hot-melt molding apparatus 1 is placed. The low-temperature system 90 may include a water pipe having a temperature of about 23° C. In these and other embodiments, the second surface 70B of the thermoelectric conversion element 70 and the low-temperature system 90 may be connected via a conductive member 91 as shown in FIG. 3, or the second surface 70B of the thermoelectric conversion element 70 may be directly attached to the low-temperature system 90. In this case, a temperature difference between the first surface 70A (the high-temperature portion) and the second surface 70B (the low-temperature portion) of the thermoelectric conversion element 70 is about 117° C., and power generated using the temperature difference of about 117° C. may be slightly greater than the 4 to 6 Watts generated according to the embodiments of FIGS. 1-2.

According to some embodiments, the hot-melt molding apparatus 1 is an extrusion molding machine. However, the present disclosure is not limited thereto. The hot-melt molding apparatus 1 may be another molding apparatus, such as an injection molding machine and a blow molding machine, which molds a thermoplastic material into a desired shape through hot melting by changing a jig provided in the downstream side of the molding head 30 and changing the shape of the molding head 30 corresponding thereto, for example.

Figure 4:
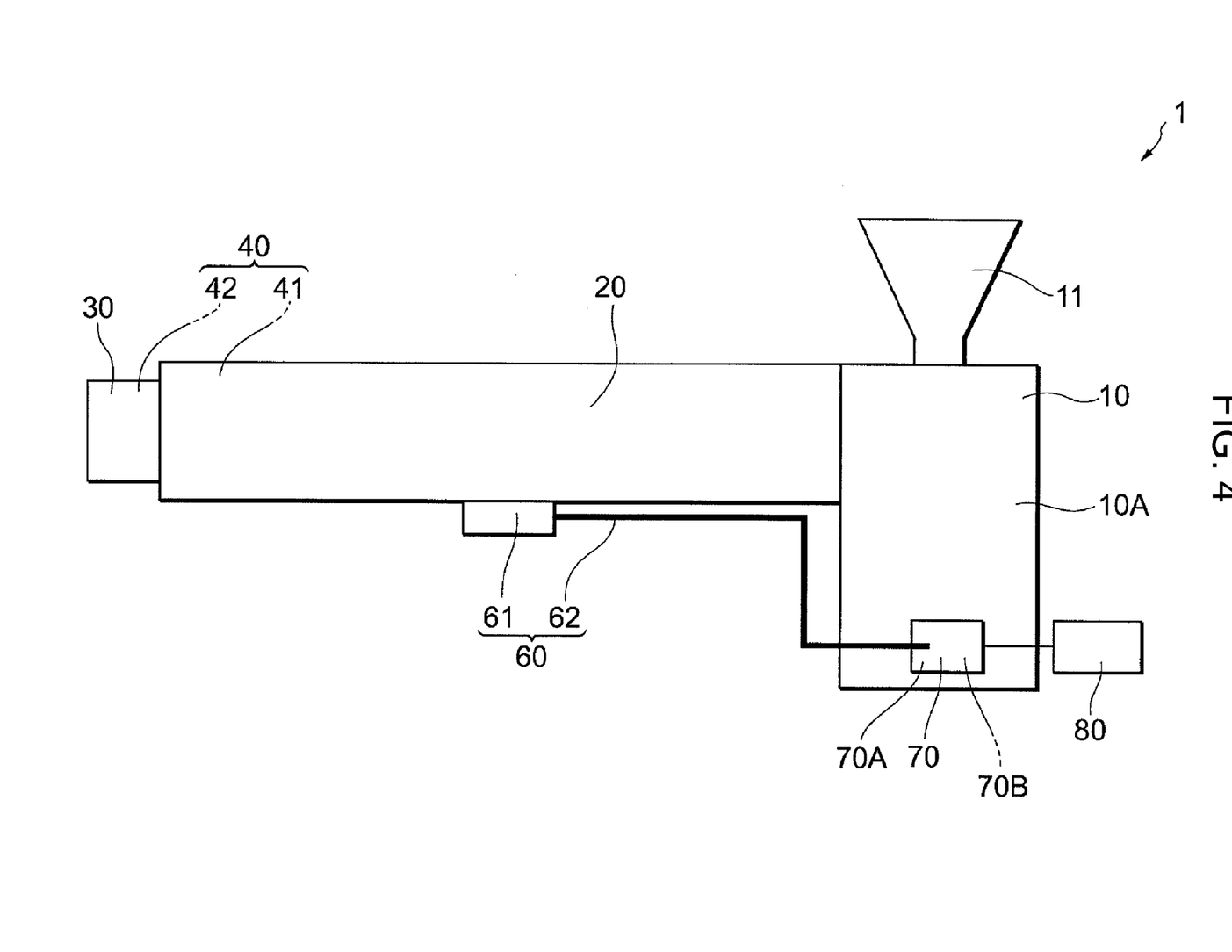
FIG. 4 is a side view schematically illustrating a hot-melt molding apparatus according to yet another embodiment.

According to some embodiments, the heat-conductive member 61 is provided in a ring shape along the outer peripheral surface of the cylinder. However, the present disclosure is not limited thereto. As shown in FIG. 4, for instance, the heat-conductive member 61 may be provided at a desired position on the outer peripheral surface of the cylinder 20 and with a desired contact area. The heat-conductive member 61 may alternately or additionally be provided in a ring shape along the outer peripheral surface of the molding head 30, with or without the heater 42 interposed therebetween, or may be provided at a desired position on the outer peripheral surface of the molding head 30 with a desired contact area therewith. Moreover, the heat-conductive member 61 (or a plurality of heat-conductive members 61) may be provided on both the outer peripheral surface of the cylinder 20 and the outer peripheral surface of the molding head 30, or at a plurality of positions on the outer peripheral surface of the cylinder 20 or at a plurality of positions on the molding head 30.

For example, when a temperature gradient exists in the axial direction of the cylinder 20, the temperature of a high-temperature portion of the cylinder 20 can be reduced by providing the heat-conductive member 61 on the high-temperature portion to transfer the heat of the high-temperature portion to the heat-conductive member 61. Accordingly, the breadth of the temperature gradient can be decreased, and the cylinder 20 can be maintained at a more uniform temperature. In such a manner, the present disclosure may be also applied to a molding process where a heating temperature needs to be controlled at high accuracy such as hot-melt molding of engineering plastic and foamable resin.

Figure 5:
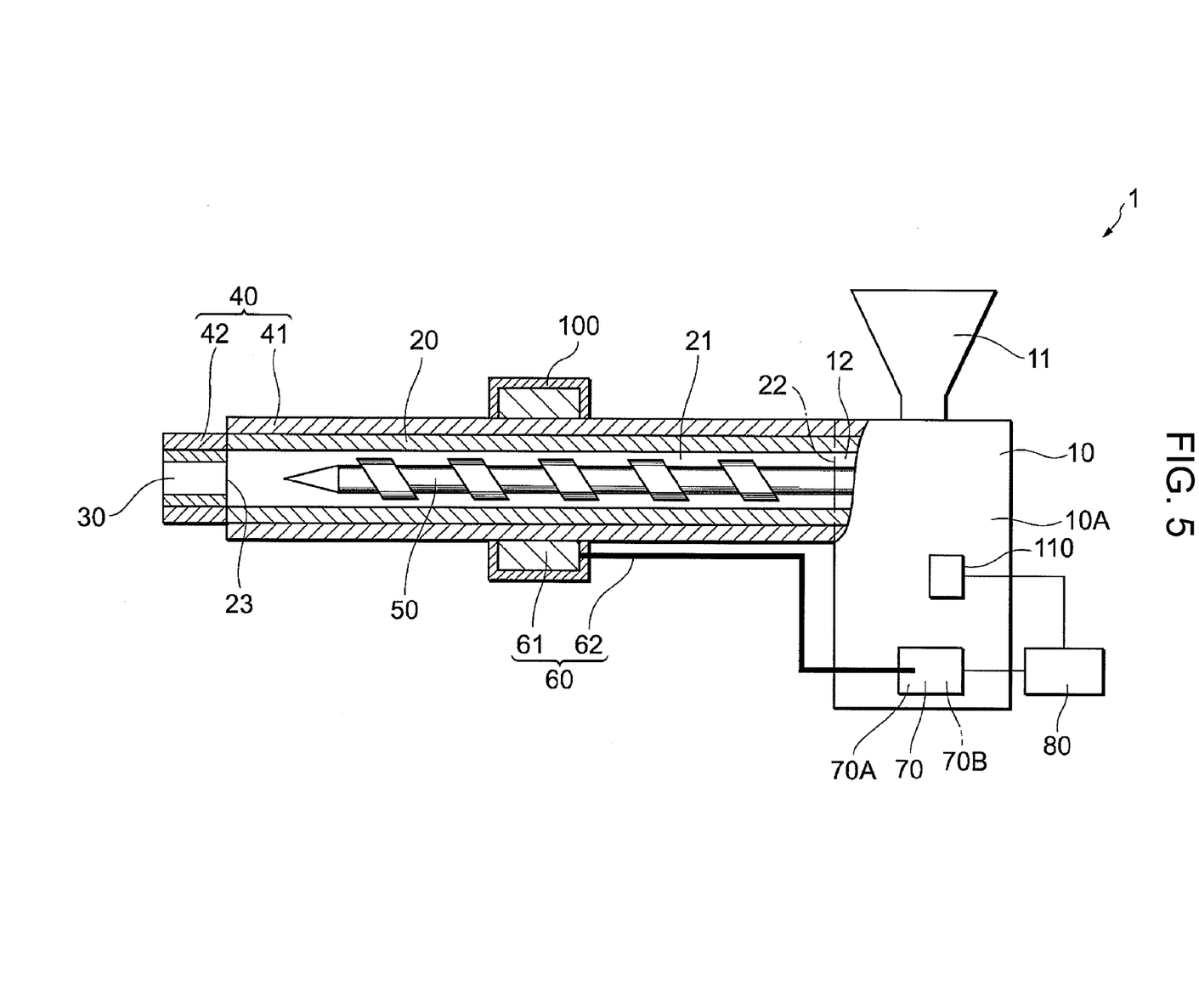
FIG. 5 is a partial sectional view schematically illustrating a hot-melt molding apparatus according to yet another embodiment.

According to some embodiments, and as illustrated in FIG. 5, the power storage section 80 may be connected to a control panel 110 provided in the apparatus body 10 to supply the power stored in the power storage section 80 to the control panel 110, so that the control panel 110 may operate with the power. Although a device operating with the power stored in the power storage section 80 is not specifically limited, the power storage section 80 may be connected to a device operating with relatively-low power such as the control panel 110 or a temperature sensor in some embodiments.

As further illustrated in FIG. 5, a portion other than a surface of the heat-conductive member 61 in close contact with the outer peripheral surface of the cylinder 20 may be at least partially surrounded by a heat-insulating material 100. Accordingly, heat dissipated from the heated cylinder 20 can be more effectively collected. The heat-insulating material 100 may also be provided in embodiments in which the heat-conductive member 61 is provided on the outer peripheral surface of the molding head 30.

One or both of the heaters 41 and 42 may include a casting heater. In these and other embodiments, one end of the heat pipe 62 may be directly connected to the casting heater without providing the heat-conductive member 61 on the outer peripheral surface of the cylinder 20 and/or the outer peripheral surface of the molding head 30.

What is claimed is:

1. A hot-melt molding method for molding a thermoplastic material into a desired shape through hot melting, comprising:
    supplying thermoplastic material into a supply port of a cylinder;
    heating the cylinder and a molding head to melt the thermoplastic material in the cylinder;
    molding the melted thermoplastic material;
    generating power by a thermoelectric conversion element using a temperature difference between a high temperature portion including at least one of the cylinder and the molding head and a low temperature portion including a housing in communication with the supply port and having a temperature lower than the high temperature portion; and
    storing the generated power.

2. The hot-melt molding method of claim 1, further comprising supplying the stored power to a device for operation.

3. The hot-melt molding method of claim 2, wherein the device includes a control panel or a temperature sensor.

4. A hot-melt molding apparatus comprising:
    a cylinder having a supply port configured to receive a thermoplastic material, and a discharge port configured to discharge the received thermoplastic material;
    a molding head in communication with the discharge port;
    a heating device configured to heat the cylinder and the molding head to melt thermoplastic material within the cylinder and the molding head;
    a conveying section disposed in the cylinder and configured to convey the thermoplastic material in the cylinder to the molding head;
    a heat-conductive member coupled to a high-temperature portion including at least one of the cylinder and the molding head, the heat-conductive member having a ring shape and being disposed along an outer peripheral surface of at least one of the cylinder and the molding head;
    a heat pipe having a first end coupled to the heat-conductive member and a second end opposite the first end;
    a thermoelectric conversion element having a first surface coupled to the second end of the heat pipe, and a second surface located on an opposite side from the first surface and coupled to a low-temperature portion, the low-temperature portion having a first temperature lower than a second temperature of the high-temperature portion and including a housing configured to house a driving section adapted to drive the cylinder; and
    a power storage section coupled to the thermoelectric conversion element and configured to store power generated by the thermoelectric conversion element.

5. The hot-melt molding apparatus of claim 4, wherein the heating device is interposed between the heat transport section and the outer peripheral surface of at least one of the cylinder and the molding head.

6. The hot-melt molding apparatus of claim 4, wherein a temperature difference between the first temperature and the second temperature is about 110° C. and the generated power is in a range of about 4 to about 6 Watts.

7. The hot-melt molding apparatus of claim 4, wherein a temperature difference between the first temperature and the second temperature is about 117° C. and the generated power is greater than 6 Watts.

8. A hot-melt molding apparatus comprising:
    a cylinder having a supply port configured to receive a thermoplastic material, and a discharge port configured to discharge the received thermoplastic material;
    a molding head in communication with the discharge port;
    a heating device configured to heat the cylinder and the molding head to melt thermoplastic material within the cylinder and the molding head;
    a conveying section disposed in the cylinder and configured to convey thermoplastic material in the cylinder to the molding head;
    a heat transport section having a first end and a second end opposite the first end, the first end being coupled to at least one of the cylinder and the molding head;
    a thermoelectric conversion element having a first surface coupled to the second end of the heat transport section, and a second surface located on an opposite side from the first surface and coupled to a low-temperature portion including a housing configured to house a driving section adapted to drive the cylinder and having a first temperature lower than a second temperature of a connection position where the first end of the heat transport section is coupled to the at least one of the cylinder and the molding head; and
    a power storage section coupled to the thermoelectric conversion element and configured to store power generated by the thermoelectric conversion element.

9. The hot-melt molding apparatus of claim 8, wherein the heat transport section comprises a heat pipe.

10. The hot-melt molding apparatus of claim 9, wherein one end of the heat pipe is coupled to the connection position via a heat-conductive member.

11. The hot-melt molding apparatus of claim 10, wherein the heat-conductive member has a ring shape disposed along an outer peripheral surface of at least one of the cylinder and the molding head.

12. The hot-melt molding apparatus of claim 11, wherein the heat-conductive member includes an inner peripheral surface in close contact with the outer peripheral surface of at least one of the cylinder and the molding head, and a portion other than the inner peripheral surface of the heat-conductive member is at least partially covered by a heat-insulating material.

13. The hot-melt molding apparatus of claim 8, wherein the conveying section comprises a screw having a longitudinal axis that is substantially parallel to a longitudinal axis of the cylinder.

14. The hot-melt molding apparatus of claim 8, wherein the hot-melt molding apparatus is configured to perform injection molding.

15. The hot-melt molding apparatus of claim 8, wherein the hot-melt molding apparatus is configured to perform extrusion molding.

16. The hot-melt molding apparatus of claim 8, further comprising a device coupled to the power storage section to operate with the power stored in the power storage section.

17. The hot-melt molding apparatus of claim 16, wherein the device coupled to the power storage section includes a temperature sensor.

18. A hot-melt molding apparatus comprising:
- a cylinder having a supply port configured to receive a thermoplastic material, and a discharge port configured to discharge the received thermoplastic material;
- a molding head in communication with the discharge port;
- a heating device configured to heat the cylinder and the molding head to melt thermoplastic material within the cylinder and the molding head;
- a conveying section disposed in the cylinder and configured to convey thermoplastic material in the cylinder to the molding head;
- a heat transport section having a first end and a second end opposite the first end, the first end being coupled to at least one of the cylinder and the molding head;
- a thermoelectric conversion element having a first surface coupled to the second end of the heat transport section, and a second surface located on an opposite side from the first surface and coupled to a low-temperature portion provided separately from the hot-melt molding apparatus and having a first temperature lower than a second temperature of a position where the first end of the heat transport section is coupled to the at least one of the cylinder and the molding head; and
- a power storage section coupled to the thermoelectric conversion element and configured to store power generated by the thermoelectric conversion element.

19. The hot-melt molding apparatus of claim 18, wherein the low-temperature portion includes a water pipe.

* * * * *

UNITED STATES PATENT AND TRADEMARK OFFICE
CERTIFICATE OF CORRECTION

PATENT NO. : 8,388,874 B2
APPLICATION NO. : 12/969011
DATED : March 5, 2013
INVENTOR(S) : Fuse It is certified that error appears in the above-identified patent and that said Letters Patent is hereby corrected as shown below:

In the Specification:

In Column 3, Line 8, delete "is side" and insert -- is a side --, therefor.

In Column 4, Line 49, delete "theses" and insert -- these --, therefor.

Signed and Sealed this
Eighteenth Day of June, 2013

Teresa Stanek Rea
*Acting Director of the United States Patent and Trademark Office*